(12) United States Patent
Blichmann et al.

(10) Patent No.: US 8,481,100 B2
(45) Date of Patent: Jul. 9, 2013

(54) BOIL KETTLE FILTRATION SYSTEM AND PROCESS

(76) Inventors: John Richard Blichmann, Lafayette, IN (US); Douglas M Granlund, Lafayette, IN (US)

( * ) Notice: Subject to any disclaimer, the term of this patent is extended or adjusted under 35 U.S.C. 154(b) by 474 days.

(21) Appl. No.: 12/798,078

(22) Filed: Mar. 30, 2010

(65) Prior Publication Data

US 2011/0244098 A1    Oct. 6, 2011

(51) Int. Cl.
  *C12C 7/16*  (2006.01)
  *C12C 13/02* (2006.01)
(52) U.S. Cl.
  USPC .............. 426/495; 426/29; 99/276; 99/278; 435/291.1
(58) Field of Classification Search
  USPC .............. 210/247, 299, 455, 515, 521, 522, 210/744, 767, 800, 801, 805; 426/16, 29, 426/489, 495, 592, 627; 435/291.1, 292.2, 435/291.3, 291.4, 291.5, 291.6, 291.7, 291.8; 99/276, 278, 410, 415, 418, 444
  See application file for complete search history.

(56) References Cited

U.S. PATENT DOCUMENTS 5,311,811 A * 5/1994 Kuzyk ..................... 99/277.1
2008/0311262 A1* 12/2008 Blichmann ................. 426/489

OTHER PUBLICATIONS

Mountain Homebrew & Wine Supply; available at: http://web.archive.org/web/20080830051231/http://www.mountainhomebrew.com/browseproducts/BoilerMaker-Kettle-Strainer.html; published on Aug. 30, 2008; accessed on Feb. 4, 2013.*

* cited by examiner

*Primary Examiner* — Chhaya Sayala
*Assistant Examiner* — Walter Moore

(57) ABSTRACT

An improved system for filtering particulate matter from a liquid in a brewing pot. The improvement includes a filter assembly positioned about a drain tube. The filter assembly has a screen member surrounded by a shield member. The shield member is positioned between the drain tube and the particulate matter separated from the liquid. The bulk of the liquid, located in a top portion of a reservoir bypasses the screen member and drains through a drain reservoir and the drain tube. After removing the shield member, the remainder of the liquid drains through the screen member or filter and into the drain reservoir preventing the particulate matter from being carried through to a fermentor.

1 Claim, 5 Drawing Sheets

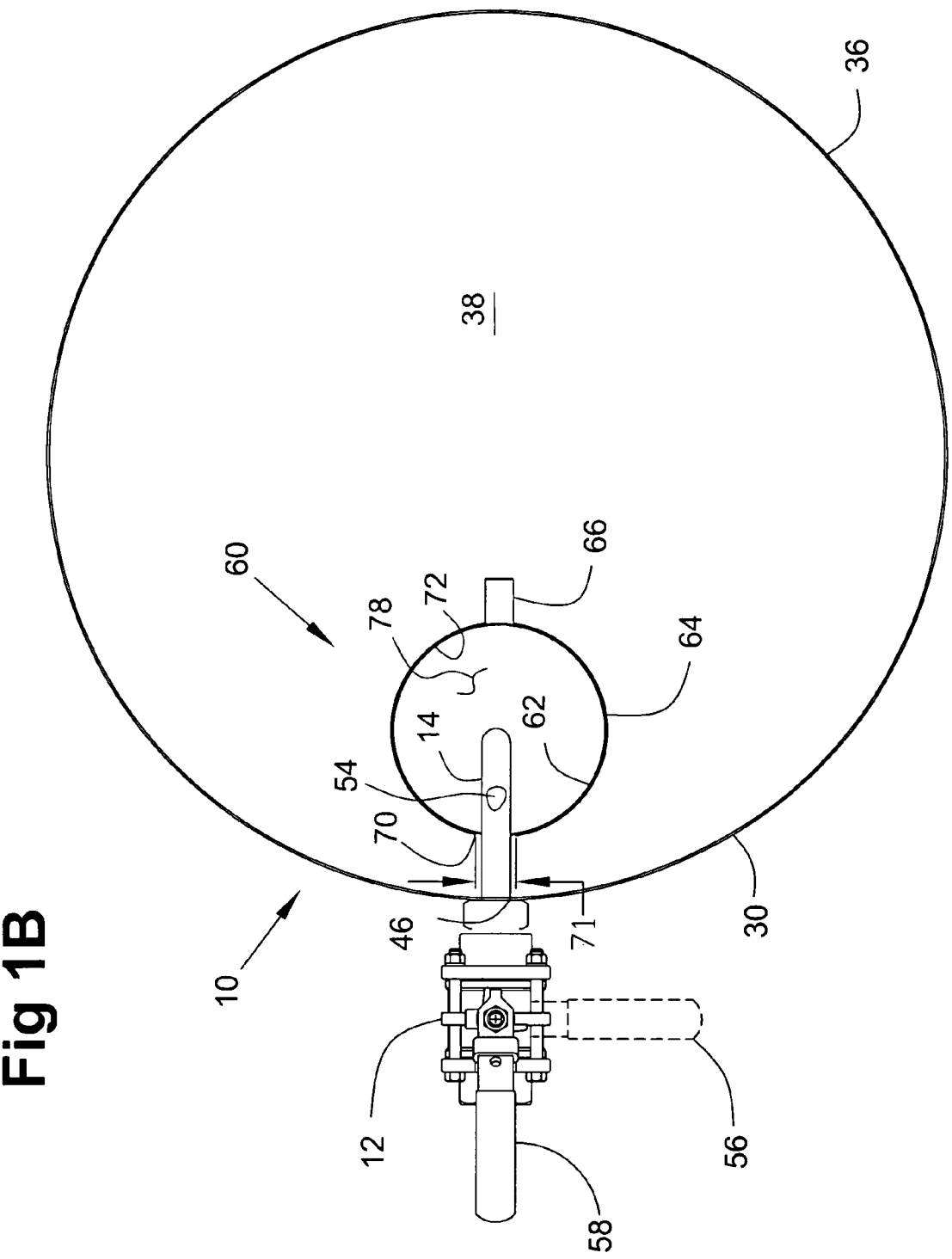

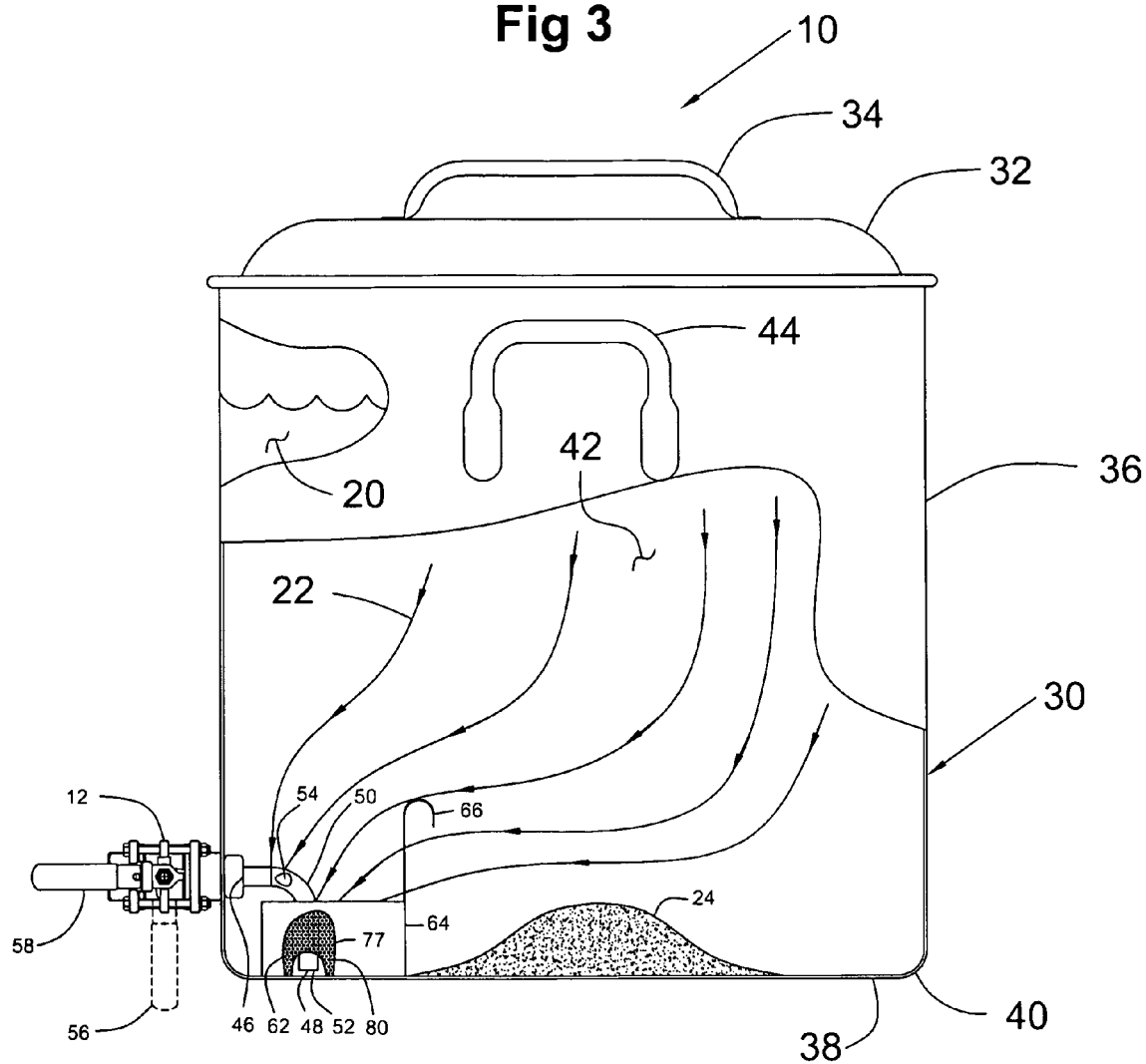

BOIL KETTLE FILTRATION SYSTEM AND PROCESS

BACKGROUND

1. Field of the Invention

This invention relates generally to a method of filtering a liquid from a brewing pot and to a structure, position and location of a filter assembly.

2. Discussion of Prior Art

It is well known in the beer brewing industry to utilize a filtration system at or near the bottom of a brew pot (boil kettle) to filter hops, trub (protein), grain particles and other particulate matter from the unfermented beer (wort). The unfermented beer needs to be drained from the brew pot and transferred to the fermentor for further processing without these undesirable particulate materials present. Of the particulate matter, pelletized "pellet hops" present the greatest challenge since the "pellet hops" are small in size and numerous in quantity.

Many methods are currently used in an attempt to remove these particulates. One method is a common perforated false bottom having openings extending through the false bottom. While this method has a fairly high surface area for filtering, the area will frequently plug. It also has a significant drawback in that it impedes the natural convection flow of the boil increasing scorching potential of the wort sugars and also limiting the effective removal of DMS (dimethylsulfide)—an important result of the boil. Many screen type filter systems are also used, but again, the limited surface area results in an unacceptable rates of plugging. A simple and common practice is to whirlpool after the boil allowing the lighter particulate matter to settle to the center of the pot. Unfortunately, when the drain valve is opened and the wort is removed, this settled particulate matter is disturbed and is sucked into the drain system since the wort is drained from or near the bottom of the pot first. Experimentation has shown that only extremely slow drain rates will prevent the settled particulate matter from being disturber or sucked into the drain tube of the drain system, however this process results in unacceptable wait times for draining the pot. Further, if this drain system does not include a filter, these particulates will be carried through to the fermentor negatively affecting beer quality. If this drain system does include a filter, these particulates will be carried to the filtering system and frequently plugging the filtering system. Other marginally effective methods include coarse filters such as stainless/copper scouring pads. Perforated or wire mesh screens are also employed as filters, but if these filters successfully filtering the particulate matter, the filters have been found to be prone to plugging from being too fine, or if too coarse the filter will let the particulate matter to be carried through to the fermentor negatively affecting the beer quality. The present method and process of draining has a unique filtering system overcomes both the tendency to plug, and provides a fast and effective filtration of the particulates giving the brewer a clear advantage.

OBJECTS AND ADVANTAGES

Accordingly, it is an object of this invention to provide a system for draining a liquid from a brew pot wherein the liquid is void of significant amounts of particulate matter.

It is another object of the invention to provide a filtering medium to prevent particulate matter to be drained with the liquid without restricting the rate of flow of the liquid from the brew pot.

In yet another object of the invention a filter structure is provided. In yet another object of the invention alternate filter structures are provided.

DESCRIPTION OF DRAWINGS

FIG. 1B shows a top view of an embodiment of the system for draining liquid from the brew pot.

FIG. 3 illustrates an embodiment of a flow of the liquid being drained from the brew pot.

DETAILED DESCRIPTION

Figure 1A:
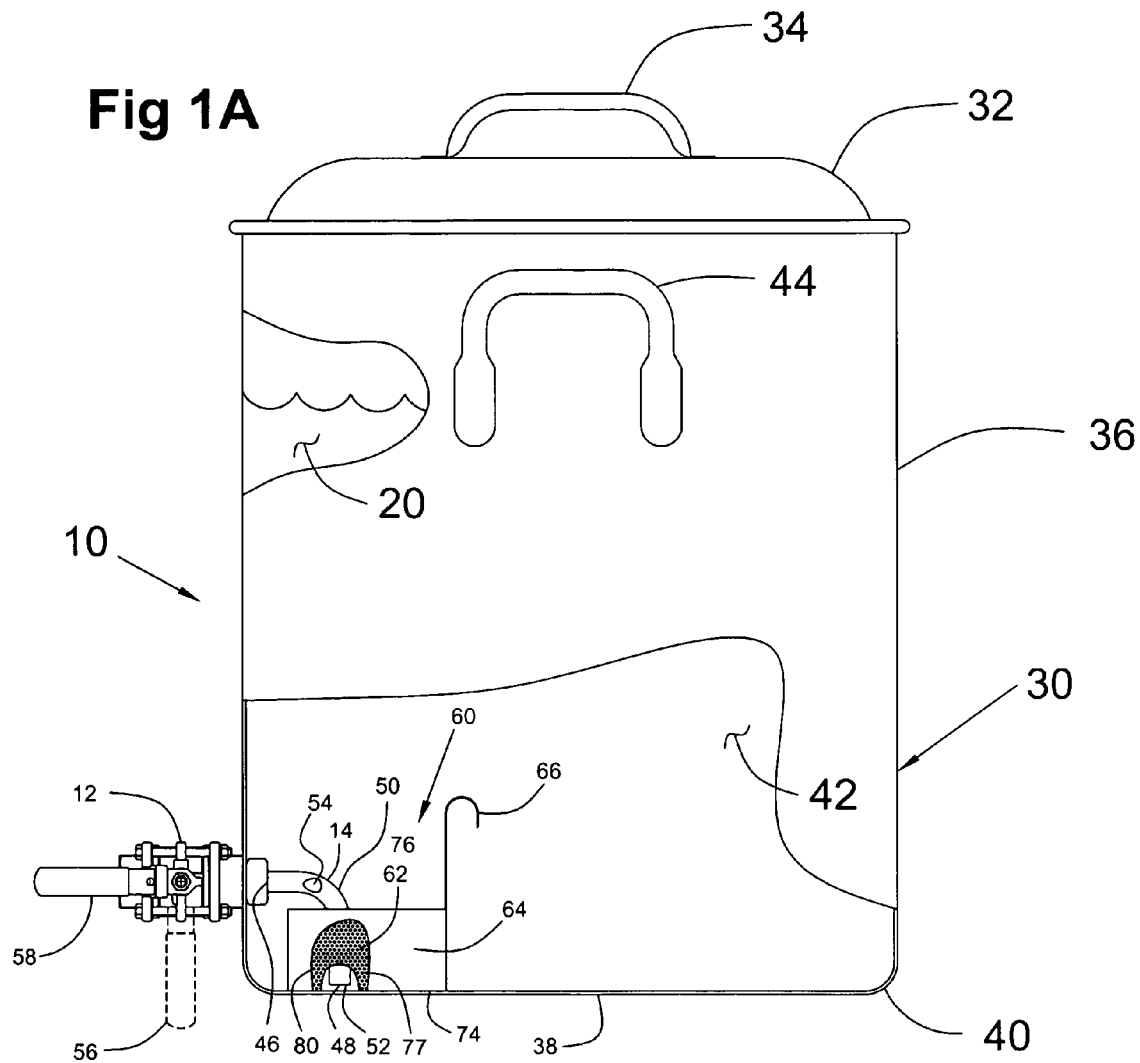
FIG. 1A shows a side view of an embodiment of a system for draining a liquid from a brew pot.

Referring to FIGS. 1A and 3, the simplest embodiment, a side elevational view, of the invention shows a system 10 for draining a liquid 20, unfermented beer, the flow lines as representative by the arrows 22 in FIG. 3 from a brew pot 30 having the liquid 20 and particulate matter 24, such as hops, trub and grain particles. The system 10 includes the brew pot 30, a drain valve 12, a drain tube 14, and a filter assembly 60.

The brew pot 30, in this application has a cylindrical configuration including a top, or lid 32 having a handle 34 attached to the top 32. The brew pot 30 has a side structure 36 and a bottom 38 connected together by a radiused portion 40. The side structure 36, bottom 38 and radiused portion 40 forms a reservoir 42 therein forming a preestablished height of an initial worth level. A pair of handles 44 are attached to the side structure 35. The drain tube 14 is affixed to the side structure 36 near the bottom 38 in a conventional manner such as by a removable sealing system or in a fixed configuration. The reservoir 42 of the brew pot 30 defines a preestablished volume. Varying the lengthy of the side structure 36 and/or the bottom 38 will change the preestablished volume accordingly.

The drain tube 14, if circular has a preestablished external diameter or if square or if rectangular or hexagonal has a preestablished external width, has a first end 46 position externally of the reservoir 42 and a second end 48 positioned internally of the reservoir 42. The drain tube 14, in this application, has a bend, preferably a 90 degree angle, indicated by reference numeral 50, positioned between the first end 46 and the second end 48 of the drain tube 14, thus having a generally "L" shaped configuration. The second end 48 faces the bottom 38 of the brew pot 30. The second end 48, in this application, has a flat configuration 52 and is spaced from the bottom 38 of the brew pot 30 a preestablished distance. As an alternative, the second end 48 could have a different configuration such as a rounded, a mitered or a tapered configuration. A passage 54 communicates between the first end 46 and the second end 48 of the drain tube 14. The drain tube 14 has a preestablished distance between the second end 48 and the 90 degree angle.

The drain valve 12 is attached to the first end 46 of the drain tube 14 in a conventional manner such as by a threaded joint or brazing. In operation, the passage 54 in the drain tube 14 communicates from the reservoir 42 to the drain valve 12. The drain valve 12 is operational between an off position 56, shown in phantom, and an on position 58. And, the drain valve 12 is movable through a plurality of positions between the off position 56 and the on position 58.

A filter assembly 60 is positioned about the second end 48 of the drain tube 14. The filter assembly has a screen member 62 encompassing the second end 48 of the drain tube 14 and a shield member 64 encompassing the screen member 62. In this application, the shield 64 has a finger pull 66 formed therewith or attached thereto. As an alternative, the finger pull 66 could be eliminated from the filter assembly 60. In this embodiment of the application, the screen member 62 and the shield member 64 has a generally cylindrical configuration having a preestablished height. In the embodiment shown in FIG. 1A the preestablished height of the screen member 62 and the shield member 64 are less than the preestablished distance between the second end 48 and the 90 degree angle of the drain tube 14. In this embodiment shown in FIG. 1A, the filter assembly 60 is void of a top member and a bottom member, to be described later.

Depending on the manner of affixing the drain tube 14 to the brew pot 30, for example if fixedly attached or if the preestablished distance between the second end 48 of the drain tube 14 and the bottom 38 of the brew pot 30 are extremely close a slit or slot 70, best shown in FIG. 1B, may need to be added in one or both of the screen member 62 and the shield member 64. If the drain tube 14 is removably attached to the brew pot and the drain tube 14 sufficiently low as to interfere with the movement of the shield 64 the slit or slot 70 would only need to be provided in the shield member 64. The size or width of the slit or slot 70 is determined by the preestablished diameter or preestablished width of the drain tube 14. The size or width of the slit or slot 70 in the shield member 64 further includes a clearance 71 to insure ease of removal. The shield member 64 is void of a plurality of openings.

The screen member 62, in this application is cylindrical in configuration and has an inside surface 72 and an outside surface 73, and is made from a perforated sheet or wire cloth. The screen member 62 has a first end 74 being place in contacting relationship with the bottom 38 of the brew pot 30, and a second end 76. As an alternative, the configuration of the screen member 62 could be other than cylindrical, such as square, rectangular, elliptical or hexagonal. In this application, the screen member 62 is made from a perforated screen forming an area of fine openings or perforations 77. The screen member 62 has a preestablished height "H". The preestablished height "H" is determined by the initial height or level of the wort. For example, the preestablished height "H" of the screen member 62 should be approximately 10 to 15 percent of the height of the initial wort level. Thus, as shown in FIG. 3, the height "H" of the screen member 62 is at or above the depth of the sediment or particulate matter in this particular application. The area of fine perforations 77 are interposed the first end 74, the second end 76 and the inside surface 72 and the outside surface 73. A drain reservoir 78 is defined within the inside surface 72 of the cylindrical configuration of the screen member 62.

The shield member 64, in this application is cylindrical in configuration, and is made of a non-perforated sheet. As an alternative, the configuration of the shield member 64 could be other than cylindrical, such as square, rectangular, elliptical or hexagonal. In this application, the shield member 64 is made from a solid sheet and is in contacting relationship or is spaced from the screen member 62 a preestablished distance. The shield member 64 has a preestablished height. In this application, the preestablished height of the shield member 64 is the same as the preestablished height "H" of the screen member 62. However, the preestablished height of the shield member 64 could be slightly higher or lower than the preestablished height "H" of the screen member 62. As a further alternative, the configuration of the shield member 64 could be different than the configuration of the screen member 62. For example, the screen member 62 could be of the cylindrical configuration and the shield member 64 could be of the hexagonal configuration without changing the gist of the application. The shield member 64 can be placed either near or against the inside surface 72 or the outside surface 73 of the screen member 62.

Figure 2A:
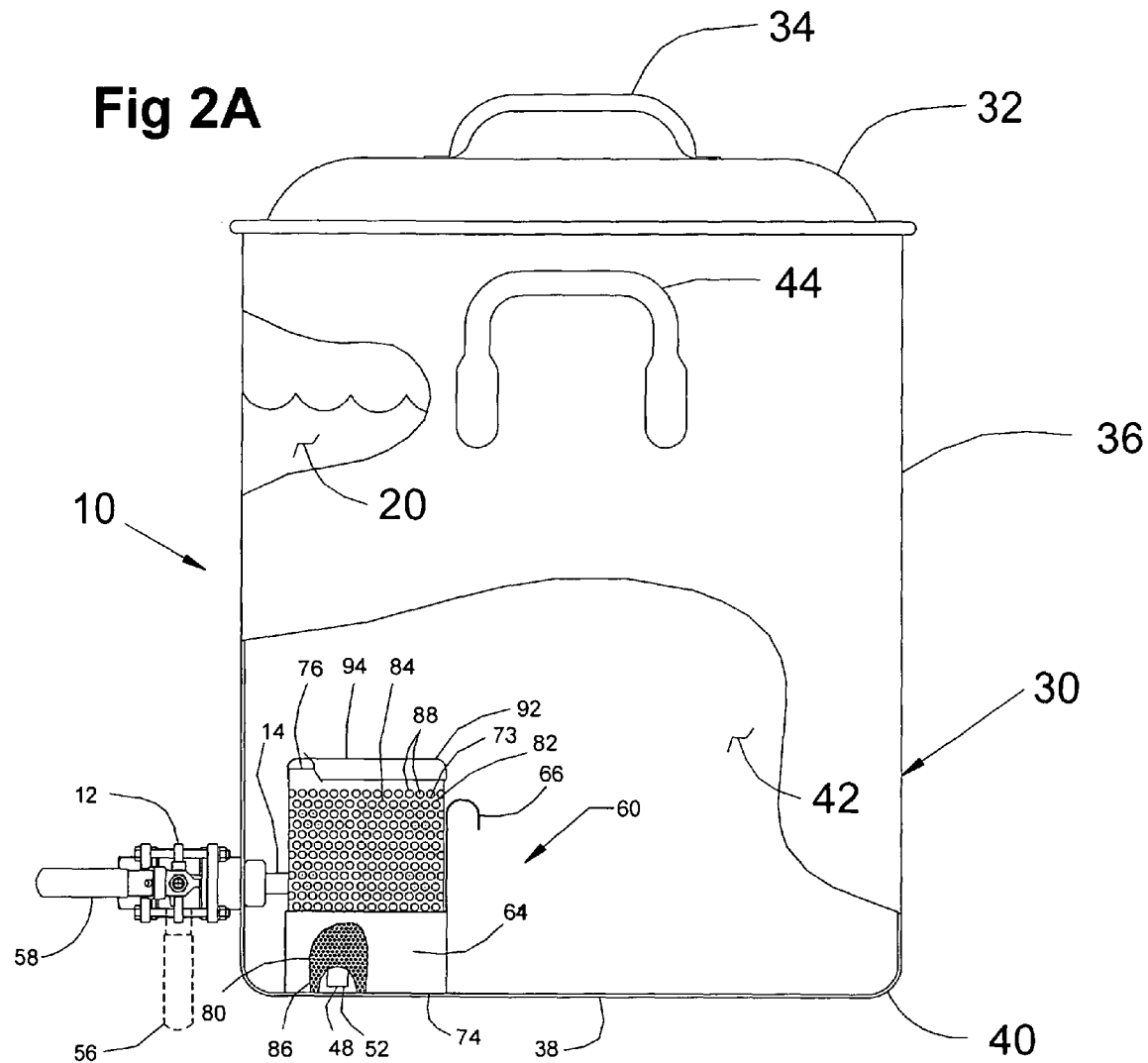
FIG. 2A shows a side view of an alternative embodiment of the system for draining liquid from the brew pot.

In another embodiment of the invention, as best shown in FIG. 2A, the screen member 62 has the area of perforation 77 divided into a first area of openings or perforations 80 and a second area of openings or perforations 82. The first area of perforations 80 are positioned near the first end 74 and extend toward the second end 76 a preestablished distance. The second area of perforations 82 are positioned near the second end 76 and extend toward the first end 74 a preestablished distance. The preestablished distance of the first area of perforations 80 is less than the preestablished distance of the second area of perforations 82. The first area of perforations 80 form the area of fine openings or perforations 77 and the second area of openings or perforations 82 form an area of course openings or perforations 84. The first area of perforations 80 are formed by a plurality of small openings 86 and the second area of perforations 82 are formed by a plurality of larger openings 88. The first area of perforations 80 or the area of fine perforations 77 have a preestablished distance equal to that of the height of the shield member 64. The second area of perforations 82 has an opening 90 therein. In this application, with the drain tube 14 being removably attached to the brew pot 30 the opening 90 is an elliptical or slotted opening to ease installation or, as an alternative, an enlarged circular hole and with the application of the drain tube 14 fixedly attached to the brew pot 30 the opening 90 would be a slot positioned in the second area of perforations 82 and extending through the first area of perforations 80 to the first end 74. As an alternative, the drain tube 14 could also be place in the area of fine openings or perforations 77. Attached to the second end 76 is a top member 92. The top member 92, in this application, has an area of course openings or perforations 94 formed therein, however as an alternative the top member 92 can be void of the area of course perforations 94. The area of course perforations 94 in the top member 92 are formed by the plurality of larger openings 88 as is the second area of perforations 82 of the screen member 62. The top member 92 may be removably attached to the screen member 62 or, as an alternative, fixedly attached to the screen member 62. As an alternative, the second end 76 may extend above the level of the worth. If so no top member 92 would be needed and the height or preestablished distance of the second area of perforations 82 would extend to a distance below the worth and away from the second end 76 of the screen member 62.

Industrial Applicability

Referring to the filter assembly 60 shown in FIGS. 1A and 1B in conjunction with the flow shown in FIG. 3, the brew pot 30 is filled with wort, liquid 20 in which hops (pelletized or whole) and other particulate matter 24 is shown. When the boil is finished, the particles are suspended in the liquid 20. After approximately 10-20 minutes of time, the particulate matter 24 have mostly settled to the bottom 38 of the brew pot 30 and the remainder of the wort is mostly free of particulates 24. A method widely known in the art is to first create a whirlpool by briskly stirring the wort. The centrifugal force encourages the lighter particulates to move toward the center and settle mostly in the bottom 24 of the brew pot 30 toward the center in a cone shape, as shown in FIG. 3, rendering the particulate matter 24 further away from the filter assemble 60. Depending on the quantity of particulate matter 24 and the size of the brew pot 30, the settling time may be shorter or longer than that referenced. With the filter assembly 60 installed, the first end 74 of the screen member is in contacting relationship with the bottom 38 of the brew pot 30 and the shield member 64 positioned over the screen member 62 encompassing the screen member 62. The opening 90 positioned over the drain tube 14 enables the shield member 64 to also be in contact with the bottom 38 of the brew pot 30. The drain valve 12 may be moves from the off or closed position 56 toward the on or open position 58 allowing the drainage of the wort to begun. Preferential flow lines 22 illustrate the flow path of the wort into the filter assembly 60 and into passage 54 of the drain tube 14. If no coarse filtration media is provided, the wort will flow directly into the top opening in the shield member 64 down toward the bottom 38 of the brew pot 30 and into the space between the second end 48 of the drain tube 14 and the bottom 38 of the brew pot 30 through passage 54 and through the drain valve 12. Noting, as seen by the arrows 20 in FIG. 3, little to no flow is experienced in the area of the settled particulate matter 24, the particulate matter 24 is thereby left undisturbed and is not drawn back into suspension with the liquid where the particulate matter 24 will clog the filter assembly 60 or enter the drain tube 14 and be diverted to the fermentor. When the level of the wort has reached the top of the filter assembly 60, the shield member 64 is lifted while leaving the screen member 62 in its original position encompassing the drain tube 14 and with the first end 74 of the screen member 62 in contacting relationship with the bottom 38 of the brew pot 30. The slit 70 and the clearance 71 insure that the shield member 64 can to be removed from the filter assembly 60, essentially the drain tube 14 and the screen member 62. It is recognized that if the drain valve 12 is moved to a position high enough along the side 36 of the brew pot 30 to allow removal of the shield member 64 from the screen member 62 the slit 70 is not needed and can be eliminated. Wort can now flow through the screen member 62 whereby only a portion of the wort (in lieu of the entire brew pot contents) needs to be filtered through the area of fine perforations 77. It is recommended that the wort drain flow rate be reduced, the drain valve is moved from the on or open position 58 toward the off or closed position 56, to limit disturbing the sediment or particulate matter 24 and improving the yield from the pot, but is not required for operation. It shall also be noted that the additional time from draining, further allows the sediment to compact making filtration more effective and further increasing the yield. Therefore it is shown that the present invention overcomes the limitations of current filtration systems by forcing preferential flow to occur leaving the sediment or particulate matter 24 undisturbed and only requiring a small portion of the wort to be filtered through the area of fine perforations 77.

Figure 2B:
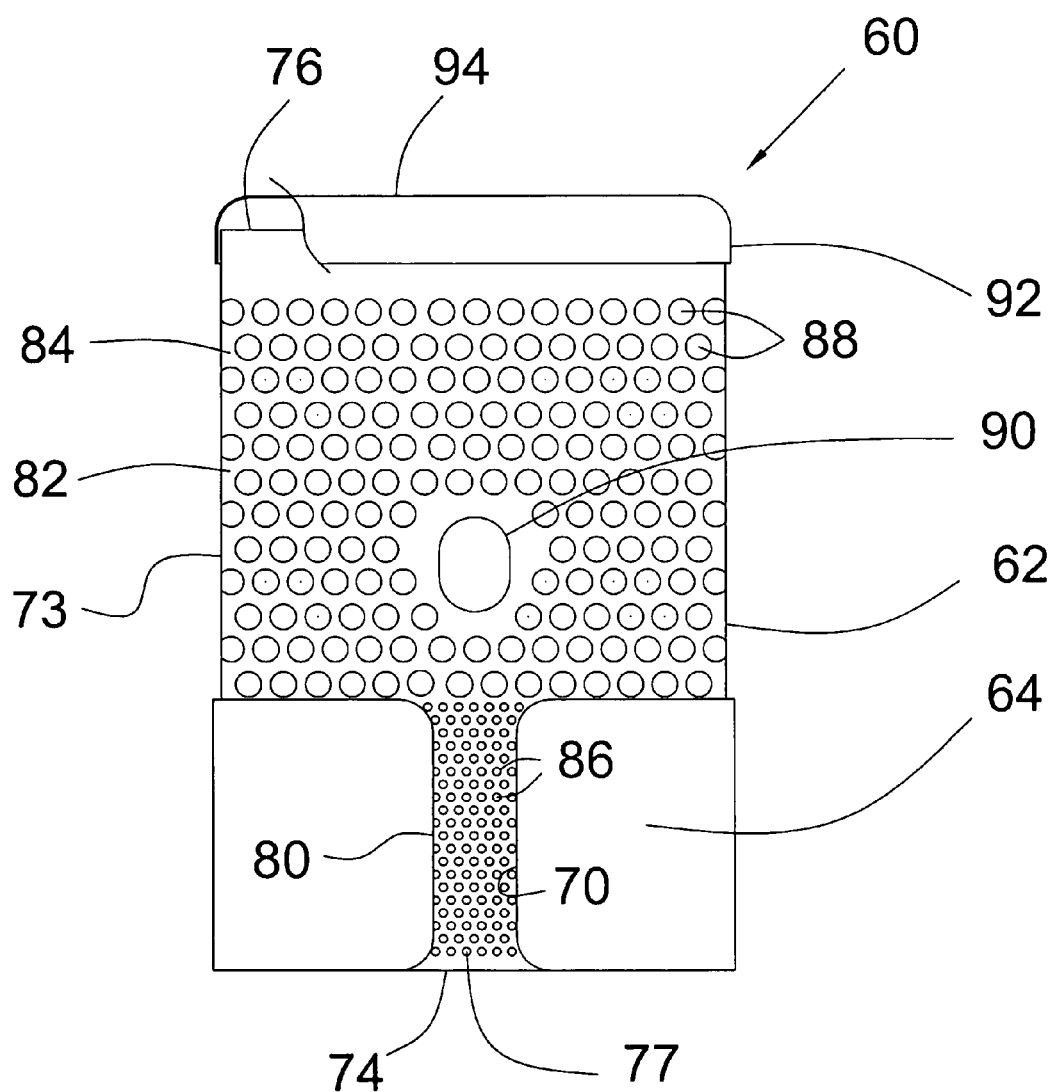
FIG. 2B shows an enlarged side view of an embodiment of a filter assembly for draining liquid from the brew pot.

When using the filter assembly 60 as shown in FIG. 2A and FIG. 2B in conjunction with the flow shown in FIG. 3 the operation is similar. For example, the brew pot 30 is filled with, wort, liquid 20 in which hops (pelletized or whole) and other particulate matter 24 is shown. When the boil is finished, the particles are suspended in the liquid 20. After approximately 10-20 minutes of time, the particulate matter 24 have mostly settled to the bottom 38 of the brew pot 30 and the remainder of the wort is mostly free of particulate matter 24. The method widely known in the art is to first create the whirlpool by briskly stirring the wort. The centrifugal force encourages the lighter particulates to move toward the center and settle mostly in the bottom 38 of the brew pot 30 toward the center in a cone shape, as shown, rendering the particulate matter 24 further away from the filter assemble 60. Depending on the quantity of particulate matter 24 and the size of the brew pot 30, the settling time may be shorter or longer than that referenced. With the filter assembly 60 installed, the first end 74 of the screen member in contacting relationship with the bottom 38 of the brew pot 30 and the shield member 64 is positioned over the first area of perforations 80 of the screen member 62 encompassing the first area of perforations 80 of the screen member 62. The opening 90 is positioned over the drain tube 14 enabling the screen member 62 to be in contact with the bottom 38 of the brew pot 30. The drain valve 12 may be moves from the off or closed position 56 toward the on or open position 58 allowing the drainage of the wort to begin. Preferential flow lines 22 illustrate the flow path of the wort into the filter assembly 60 and into passage 54 of the drain tube 14. The flow of wort indicated by the arrows 20 will enter the area of course perforations 94 in the top member 90 and/or the second area of perforations 82 of the screen member 62. If no top member 90 is provided, the wort will flow directly into the top opening of the screen member 62 and/or area of course perforations 94 in the screen member 62 down toward the bottom 38 of the brew pot 30 and into the space between the second end 48 of the drain tube 14 and the bottom 38 of the brew pot 30 through passage 54 and through the drain valve 12. Noting, as seen by the arrows 20 in FIG. 3, little to no flow is experienced in the area of the settled particulate matter 24, the particulate matter 24 is thereby left undisturbed and is not drawn back into suspension in the liquid where the particulate matter will clog the filter assembly 60 or enter the drain tube 14 and be diverted to the fermentor. The flow of the wort 20 continues through the area of course perforations 94 in the screen member 62 until the level of the wort is even with the shield member 64. When the level of the wort has reached the top of the shield member 64, the shield member 64 is lifted while leaving the screen member 62 in its original position encompassing the drain tube 14 and with the first end 74 of the screen member 62 in contacting relationship with the bottom 38 of the brew pot 30. The slit 70 and the clearance 71 insure that the shield member 64 can to be removed from the filter assembly 60, essentially the drain tube 14 and the screen member 62. It is recognized that if the drain valve 12 is moved to a position high enough to allow removal of the shield member 64 from the screen member 62 the slit 70 is not needed and can be eliminated. Wort can now flow through the area of fine perforations 77 in the screen member 62 whereby only a portion of the wort (in lieu of the entire pot contents) needs to be filtered through the area of fine perforations 77. It is recommended that the wort drain flow rate be reduced, the drain valve is moved from the on or open position 58 toward the off or closed position 56, to limit disturbing the sediment or particulate matter 24 and improving the yield from the pot, but is not required for operation. It shall also be noted that the additional time from draining, further allows the sediment to compact making filtration more effective and further increasing the yield. Therefore it is shown that the present invention overcomes the limitations of current filtration systems by forcing preferential flow to occur leaving the sediment or particulate matter 24 undisturbed and only requiring a small portion of the wort to be filtered through the area of fine perforations 77.

Summary, Ramifications, And Scope

Many ramifications of the invention are possible. For example, numerous shapes of the system 10 and the filter assembly 60 and are possible such as rectangular, elliptical, hexagonal etc. Or the filter assembly 60 can be integral to the side 36, by having the components "U" shaped and/or bottom 38 of the brew pot 30 whereby it is affixed to the side 36, bottom 38 of the brew pot 30 or the drain tube 14 whereby a portion of the side 36 and/or bottom 38 of the brew pot 30 are utilized to form the preferential flow cavity. In addition, the drain valve 12 may be located low enough in the brew pot 30 that a curved drain tube 14 is not necessary and a straight drain tube 14 may be utilized. Or, the drain valve 12, if placed sufficiently low in the brew pot 30, and is used in conjunction with the ramifications that utilize a portion of the side structure 36 of the brew pot 30, the drain tube 14 can be completely eliminated. Shield member 64 may also be fabricated with hinges for ease of removal. Or made without a pull 66, or the pull 66 could be of numerous shapes other than that shown in the drawings. The opening 90 can also be eliminated if the design is such that there is no interference with the drain tube 14. The shield member 64 may also be located on or near the inside surface 72 of screen member 62 in lieu of the outside surface 74 as depicted. While it is preferred to have the shield member 64 in contacting relationship with the screen member 62 to keep the screen member 62 as clean as possible the invention will function adequately if there is a gap or small space between the screen member 62 and the shield member 64. Numerous screen profiles, shapes, and types can be utilized. Perforations, wire screens being most common, for example, as well as round, rectangular, slotted holes, or expanded metal for making the screen member. It is also known that a bottom and the top member 92 can be affixed to filter assembly 60 further enclosing the filter assembly 60 to prevent particulate matter 24 from entering underneath the invention should it be accidentally bumped during draining.

Reference Numerals In Drawings
10 System
12 Drain Valve
14 Drain Tube
16
18
20 Liquid (Unfermented Beer)
22 Arrow (Flow)
24 Particulate Matter (Hops, Trub and Grain)
26
28
30 Brew Pot
32 Top or Lid
34 Handle (Top)
36 Side Structure (Brew Pot)
38 Bottom (Brew Pot)
40 Radiused Portion (Brew Pot)
42 Reservoir (Brew Pot)
44 Pair of Handles (Side Structure)
46 First End (Drain Tube—External of Reservoir)
48 Second End (Drain Tube—Internal of Reservoir)
50 90 Degree Angle (Drain Tube)
52 Flat Configuration (Second End—Drain Tube)
54 Passage (Drain Tube)
56 Off Position (Drain Valve—Phantom)
58 On Position (Drain Valve)
60 Filter Assembly
62 Screen Member
64 Shield Member
66 Pull (Shield Member)
68
70 Slit (Shield Member)
71 Clearance (Slit)
72 Inside Surface (Screen Member)
73 Outside Surface (Screen Member)
74 First End (Screen Member—Bottom))
76 Second End (Screen Member—Top)
77 Area of Fine Openings or Perforations (Screen Member)
78 Drain Reservoir (Screen Member)
80 First Area of Openings or Perforations (Screen Member—First End—Bottom)
82 Second Area of Openings or Perforations (Screen Member—Second End—Top)
84 Area of Course Openings or Perforations (Screen Member—Second End—Top)
86 Plurality of Small Openings (Screen Member—First End—Bottom)
88 Plurality of Large Openings (Screen Member—Second End—Top)
90 Opening (Second Area of Openings or Perforations—Screen Member—Intermediate)
92 Top Member
94 Area of Course Openings or Perforations (Top Member)

The invention claimed is:

1. A method of draining a liquid from a brew pot, said liquid having particulate matter suspended therein, said brew pot having a bottom and a side structure, said bottom and said side structure forming a reservoir therein, a drain tube having a first end and a said second end and a passage interposed said first end and said second end, and said second end being positioned internally of said reservoir, said second end being positioned near said bottom, said first end of said drain tube having a drain valve attached thereto, said drain valve being movable between an off position and an on position; said method of draining the liquid from the brew pot comprising the steps of:

positioning a screen member encompassing said second end of said drain tube, said screen member having a first end and a second end spaced apart by a preestablished height "H", said first end being in contact with said bottom of said brew pot, said screen member having a plurality of openings interposed on an inside surface and an outside surface;

positioning a shield member encompassing said second end of said drain tube, said shield member having a preestablished height, said shield member being void of any plurality of openings and being positioned at one of said inside surface and said outside surface;

allowing a portion of said suspended matter to settle from said liquid, said removed suspended matter being collected on said bottom of said brew pot, and said screen member and said shield member having been positioned between said second end of said drain tube and said removed suspended matter collected on said bottom of said brew pot;

forming a drain reservoir with the positioning of at least one of said screen member and the positioning of said shield member;

moving said drain valve into said on position and draining a portion of said liquid from said reservoir through drain reservoir and said passage and to said drain valve;

removing said shield member from being encompassing said second end of said drain tube and draining a remainder of said liquid through said screen member prior to passing through drain reservoir and said passage to said drain valve.

* * * * *